United States Patent [19]

Botsolas

[11] Patent Number: 5,025,836
[45] Date of Patent: Jun. 25, 1991

[54] PIPE FITTING COVER FOR COVERING PIPE FITTING

[75] Inventor: Chris J. Botsolas, St. Petersburg, Fla.

[73] Assignee: Carol Botsolas, St. Petersburg, Fla.

[21] Appl. No.: 506,567

[22] Filed: Apr. 3, 1990

Related U.S. Application Data

[63] Continuation of Ser. No. 347,984, May 5, 1989, abandoned, which is a continuation of Ser. No. 141,696, Jan. 7, 1988, abandoned.

[51] Int. Cl.$^5$ .................. F16L 55/16; F16L 59/16
[52] U.S. Cl. ..................... 138/110; 138/128; 138/149; 138/171; 138/178; 137/325; 428/43
[58] Field of Search ............... 138/103, 110, 99, 128, 138/149, 171, 178; 137/375; 428/43, 68, 76, 192

[56] References Cited

U.S. PATENT DOCUMENTS

| 98,603 | 1/1870 | Lee | 138/128 |
|---|---|---|---|
| 186,492 | 1/1877 | Murphy | 138/128 |
| 772,412 | 10/1904 | Garrett et al. | 138/110 |
| 1,249,038 | 12/1917 | Dabney | 138/110 |
| 1,261,133 | 4/1918 | Kidd | 428/43 |
| 1,993,965 | 3/1935 | Huck et al. | 138/128 |
| 3,547,752 | 12/1970 | Janssen | 428/43 |
| 4,112,967 | 9/1978 | Withem | 137/375 |
| 4,207,918 | 6/1980 | Burns et al. | 137/375 |
| 4,556,082 | 12/1985 | Riley et al. | 137/375 |
| 4,669,509 | 6/1987 | Botsolas | 138/110 |
| 4,696,324 | 9/1987 | Petronko | 137/375 |
| 4,885,194 | 12/1989 | Tight et al. | 428/43 |

FOREIGN PATENT DOCUMENTS 19622  9/1892  United Kingdom ............... 138/128

Primary Examiner—James E. Bryant, III
Attorney, Agent, or Firm—Hedman, Gibson, Costigan & Hoare

[57] ABSTRACT

A rigid or semi-rigid cover for installation over an insulated pipe fitting is provided. The cover is pre-cut in the geometric design that enables it to conform to the shape of the pipe fitting when installed.

12 Claims, 3 Drawing Sheets

PIPE FITTING COVER FOR COVERING PIPE FITTING

This is a continuation of application Ser. No. 347,984 filed May 5, 1989, now abandoned, which is a continuation of application Ser. No. 141,696 filed Jan. 7, 1988 not abandoned.

FIELD OF THE INVENTION

The invention relates to rigid and semi-rigid pipe fitting covers and a process for covering pipe fittings. More specifically, the invention relates to pipe fitting covers which by their geometrical design are adapted to be folded into a shape that conforms to the shape of a given pipe fitting.

BACKGROUND OF THE INVENTION

The conveyance of hot or cold fluids through piping and piping assemblies normally makes it desirable to insulate the piping. Usually, this involves wrapping or placing an insulation material over the exterior of the piping and covering the insulation.

Early efforts at insulating piping consisted of spreading cement in place on the exterior of the pipes and pipe fittings and then adhering a fabric covering over it. Prior art procedures have progressed since then to include aluminum and plastic covers for the piping and various fittings, used in conjunction with insulation materials such as fiberglass blanket or urethane foam. In some instances the insulation material is adhered to the inside surface of the cover such that the insulation and cover are joined in place at the same time. In other instances the insulation is first formed or placed around the piping or pipe fittings and the aluminum or plastic covers are then secured in place over the insulation.

Certain covers designed specifically for elbow pipe fittings are described in U.S. Pat. No. 3,495,629 (Botsolas, February, 1970). They are made from rigid, semi-resilient material as a single, integral structure having the shape of an elongated, open-ended trough. When placed into position around the elbow joint during installation, the cover assumes a shape in the configuration of the elbow joint. The material from which the shaped cover is formed can be a thin walled synthetic plastic material, for example, a rigid vinyl resin, and the cover can be used with or without insulation adhered to the inner surface.

Also noteworthy are pipe fitting covers described in U.S. Pat. No. 3,732,894 (Botsolas, May, 1973). They are comprised of two shaped half-sections connected together at a single point around which the two sections can rotate. The unique design provides advantages in shipping and storage by enabling the half-sections to be revolved into a superimposed, nested relationship. This permits stacking, which in turn facilitates handling and minimizes the usage of space.

SUMMARY OF THE INVENTION

It is an object of the present invention to provide an efficient, economical and more convenient way to insulate pipe fittings in a piping assembly.

It is another object of the present invention to provide a pipe fitting cover made of a watertight material that can easily be cut and trimmed into the proper geometric shape of the pipe fitting to be covered.

It is a further object to provide a pipe fitting cover made of a rigid or semi-rigid material that can be easily wrapped around the pipe fitting and secured snugly in place.

To achieve these objectives, a fitting cover has been provided which, in essence, is made of a rigid or semi-rigid watertight material as a single piece of integral structure in a first, substantially flat shape. The cover is adapted in its geometry or outline to be folded into a second shape that conforms geometrically to the shape of the pipe fitting to be covered. The cover includes two, or more, outward projections, or tabs, which serve as connecting members to secure the cover snugly in place over the fitting.

The cover members of this invention are designed to be used with a variety of pipe fittings, including, especially, tee and elbow fittings.

In practice, the tee cover can be installed over a range of insulation thicknesses due to the capacity of the covers to be cut and trimmed to the proper shape and size, even on the job site.

DESCRIPTION OF THE DRAWINGS

The present invention will be better understood when viewed with the accompanying drawings, in which.

DESCRIPTION OF THE PREFERRED EMBODIMENTS

The present invention is suitable for use in any pipe installation in which fittings are used to join with straight sections of piping.

Figure 1:
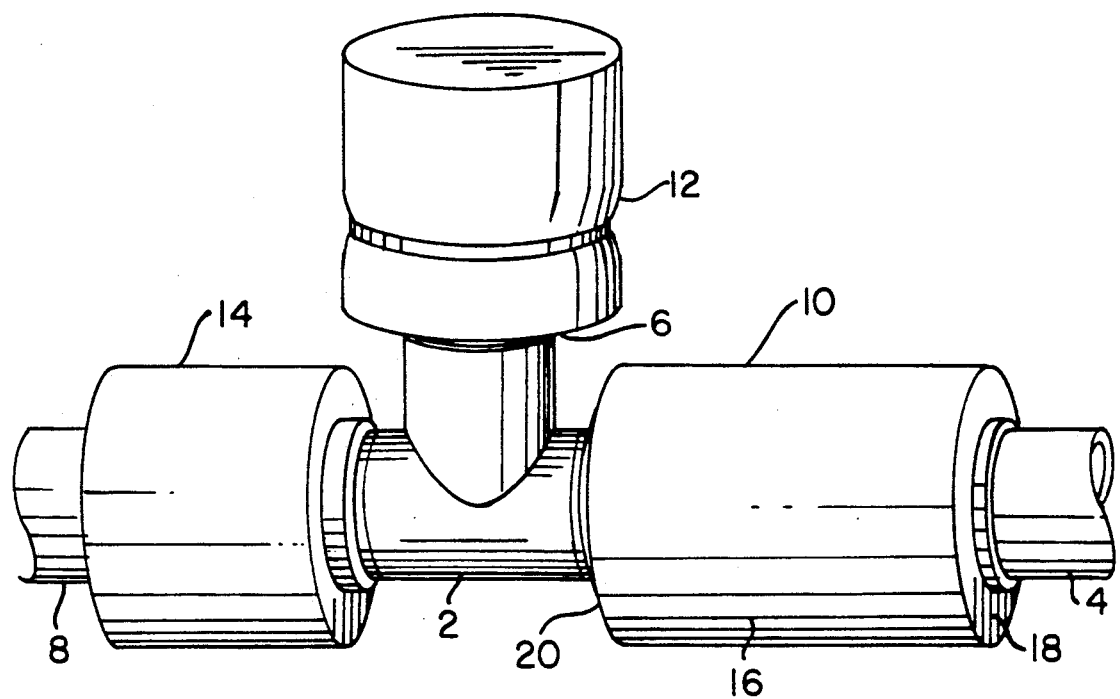
FIG. 1 is an isometric view of a portion of a piping assembly joined by a tee fitting.

As seen in FIG. 1, a partially insulated piping assembly is shown with tee fitting 2, which joins pipes 4, 6 and 8. The sections of the pipe adjacent to tee fitting 2 are covered with insulation jackets 10, 12 and 14, each of which fully encloses a layer of insulation material (not shown) that has been wrapped around the pipe. Each jacket 10, 12 and 14 consists of a main body 16 and end covers 18 and 20. In practice it is necessary to also insulate the tee fitting 2, which, as seen in FIG. 1, is presently exposed. The tee fitting cover of this invention is readily useful for that purpose.

Figure 2:
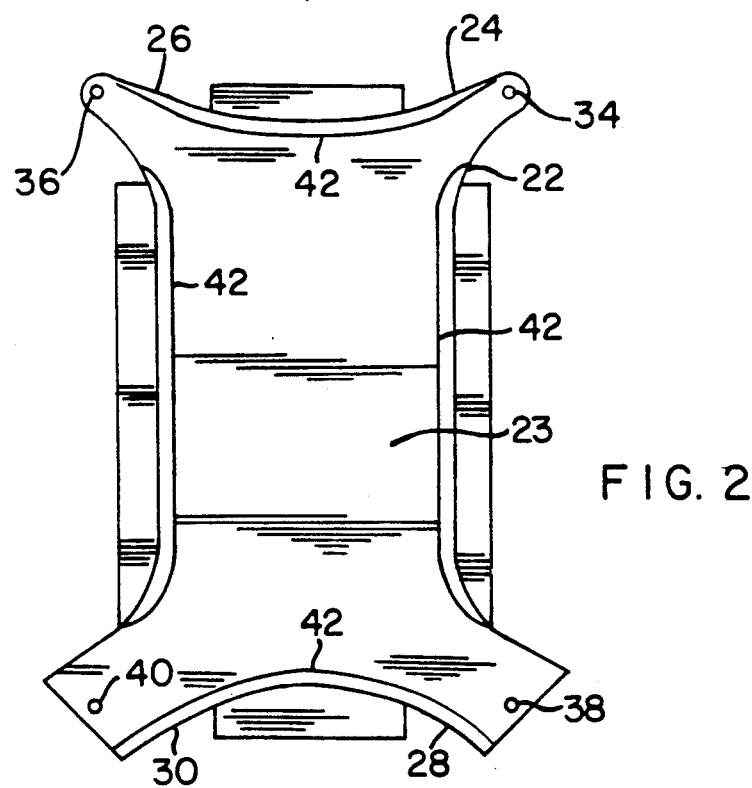
FIG. 2 is a top plan view of a tee fitting cover of the present invention useful for covering the fitting of FIG. 1.

As shown in FIG. 2, prior to use the tee fitting cover 22 of the present invention is a flat, unitary piece of material which has been pre-cut to conform geometrically to the shape of the tee fitting 2. The cover 22 consists of a main body portion 23 and connecting members 24, 26, 28 and 30, which are essentially flat continuations protruding from the main body 23 of the cover 22. Connecting members 24 and 26, which are somewhat tapered near their ends, contain snap enclosures male fastening means 34 and 36, respectively, while connecting members 28 and 30 contain female fastening means 38 and 40, respectively, which serve as receptors for 34 and 36 when the cover 22 is in place on the fitting 2.

The tee fitting cover 22 can be made of any rigid or semi-rigid watertight material, including aluminum, other metals or plastics, for example, polyvinyl chloride or polypropylene. The material must necessarily be of a nature that it can be easily pre-cut or trimmed so that it will be geometrically correct for the pipe fitting. To this end, the cover 22 can be provided with score lines 42, which have been previously pressed or cut into the material, to facilitate trimming on the job site. The score lines 42, or strip-off strips, can be geometrically laid out so as to act as a reducing end on any of the three directions of the tee fitting 2. It therefore can take the form of a tee 2 that has three or less reducing exits by stripping or cutting out to the appropriate line 42.

The material of the cover 22 must be a malleable rigid or semi-rigid material capable of being folded around the tee fitting 2 starting from an essentially flat shape. Thin polypropylene or polyvinyl chloride, or thin aluminum or stainless steel sheeting are examples of materials suitable for this purpose.

Figure 3:
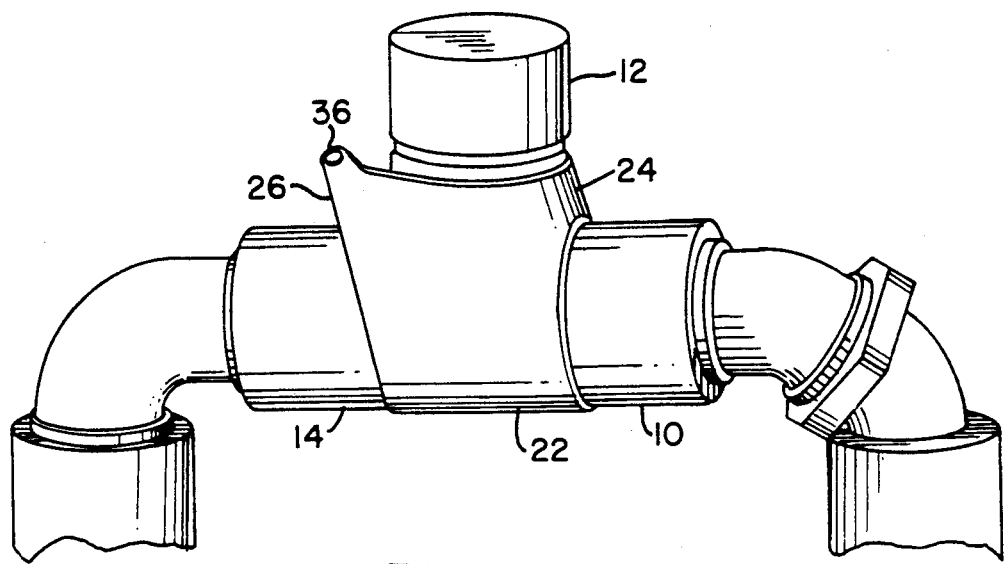
FIG. 3 is an isometric view of a tee fitting cover of the present invention partially installed on the fitting of FIG. 1.

As seen in FIG. 3, the partially installed tee fitting cover 22 is shown over the tee fitting 2 (not shown). The side of fitting cover 22 on which connecting members 24 and 28 are located is fastened in place and pulled tightly over the tee fitting 2. The side of the fitting cover 22 on which connecting members 26 and 30 (only 6, with fastening means 36 is shown) are located is shown unfastened.

Figure 4:
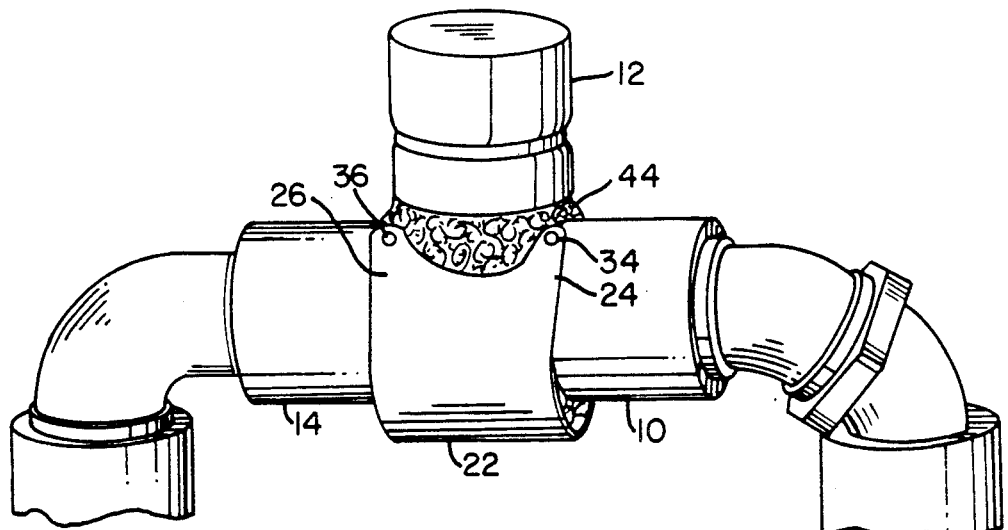
FIG. 4 is an isometric view of a tee fitting cover of the present invention partially covering the fitting of FIG. 1, showing an underlying layer of insulation material.

As seen in FIG. 4, tee fitting cover 22 is shown partially pulled away to expose insulation blanket 44, which is wrapped around the tee fitting 2. The insulation blanket 44 can be made of fiberglass or any other conventional material suitable for the insulation of piping. In this view of fitting cover 22, connecting members 24 and 26, with fastening means 34 and 36, are shown.

Figure 5:
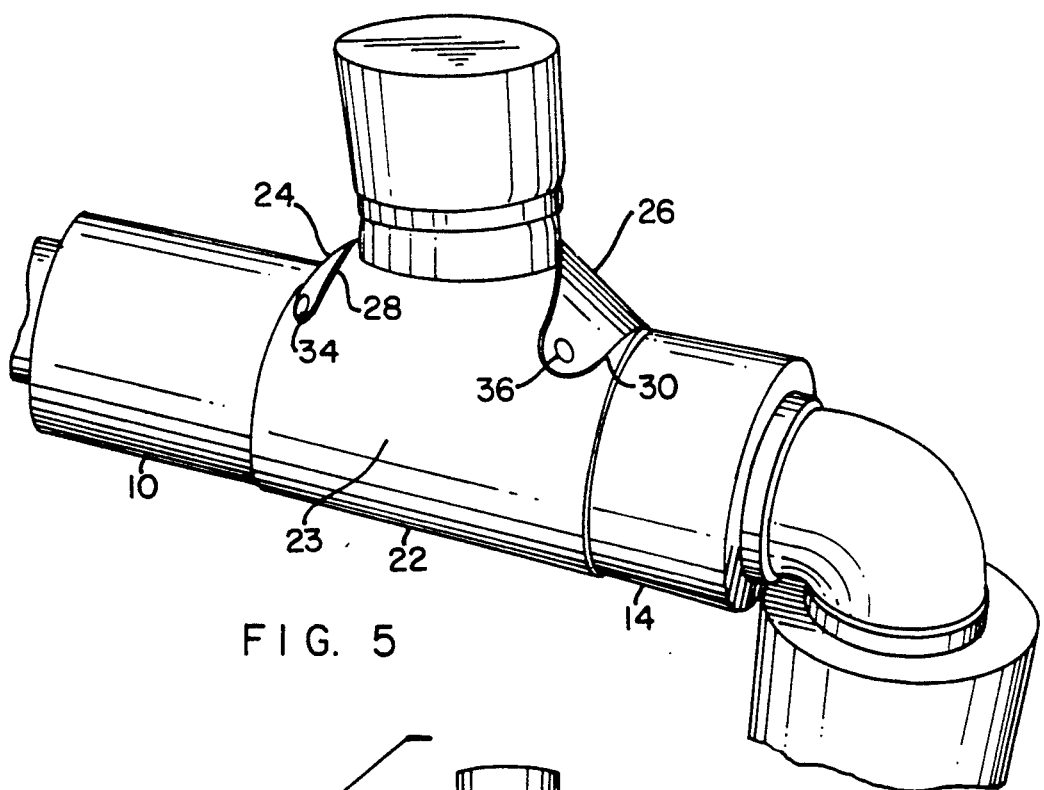
FIG. 5 is another embodiment of a tee fitting cover of the present invention, from the reverse side, completely installed and fastened in place over the fitting of FIG. 1.

As seen in FIG. 5, a tee fitting cover 22 in accordance with this invention is shown in a completely installed form. Main body 23 is wrapped tightly around the tee pipe fitting 2 (not shown), with connecting members 24 and 26 overlapping connecting members 28 and 30. The connecting members are fastened to one another by fasteners 34 and 36, located on connecting members 24 and 26. These are joined to fasteners 38 and 40 (not shown), located on underlying connecting members 28 and 30, respectively. A benefit of this arrangement is that the snug fit caused by the pulling of the connecting members 24, 26, 28 and 30 tends to compress and compact the underlying insulation material 44. Tee fitting cover 22 overlaps adjacent insulation jackets 10 and 14 on either side of the tee fitting 2. A watertight seal is ensured by applying a silicone or other type of chemical sealer between the overlapping surfaces of the connecting members 24, 26, 28 and 30 and the adjacent jacketing 10, 12 and 14.

Figure 6:
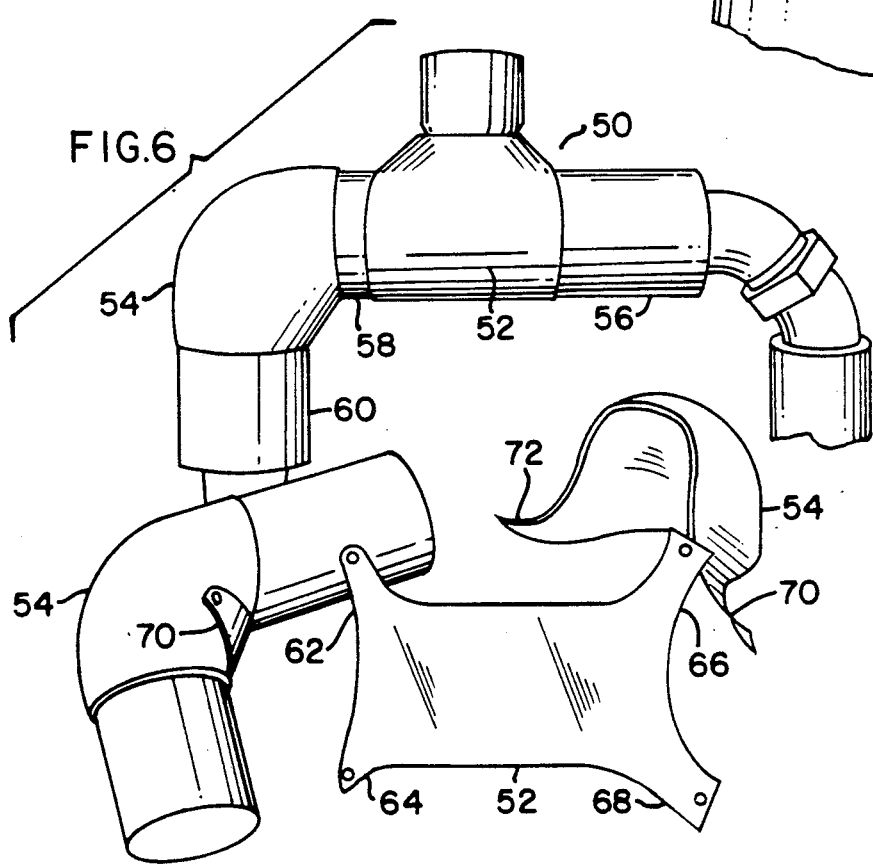
FIG. 6 is a view of a tee fitting cover and a ninety degree elbow cover in accordance with the present invention, as well as an assembly of tee and ninety degree elbow fittings covered with these same covers.

As seen in FIG. 6, an assembly of piping 50 is shown covered by various appropriate fitting covers of the present invention. The cover members are comprised of tee fitting cover 52 and ninety degree elbow fitting cover 54. In the installation shown in FIG. 6, the pipe insulation is first applied, for example, by applying a urethane foam or wrapping with blanket-type insulation (not shown). Thereafter, the fitting covers 50 and 52 are trimmed around the edges, if necessary, to ensure a perfect geometric fit and placed over the pipe fittings, with the side edges projecting over the adjacent pipe jackets 56, 58 and 60. Tee fitting cover 52 comprises four projecting connecting members, 62, 64, 66 and 68, while ninety degree elbow fitting cover 54 comprises only two projecting connecting members, 70 and 72. Elbow fitting 5 cover 54 is also shown in isolation installed snugly in place over the elbow fitting, with connecting member 70 overlying and secured to connecting member 72.

The covers of this invention may be installed with use of any conventional insulation for piping assemblies. A particularly convenient type is fiberglass insulation, and especially fiberglass in the form of blankets, which may be used in single or multiple layers prior to application of the covers.

While the invention has been described in detail and with reference to specific embodiments thereof, it will be apparent to one skilled in the art that various changes and modifications can be made therein without departing from the spirit and scope thereof. For example, any standard means for securing the connecting members about the pipe fitting are contemplated, i.e. tape, screws, rivets, etc. All such obvious variations are intended to fall within the scope of the appended claims.

I claim:

1. A cover for a pipe fitting comprising a body made of semi-rigid watertight material and having opposed ends, said body adapted to fold to the shape of the pipe fitting from an initially substantially flat shape, at least one of said ends having a terminal portion and fastening means operatively connected thereto for securing said ends about the pipe fitting, said cover including at least one line of weakness constituting a means to trim said cover to correspond to the geometrical configuration of the pipe fitting and provide a secure fit of the cover about the pipe fitting on the job site.

2. The cover of claim 1 wherein each opposed end has at least a pair of fastening means.

3. The cover of claim 1 wherein said pipe fitting is an elbow.

4. The cover of claim 1 wherein said material is plastic.

5. The cover of claim 4 wherein said plastic is polyvinyl chloride.

6. The cover of claim 1 wherein said material is sheet metal.

7. The cover of claim 6 wherein said sheet metal is aluminum.

8. The cover of claim 6 wherein said sheet metal is stainless steel.

9. The cover of claim 1 wherein said fastening means are selected from the group consisting of tape, screws, and rivets.

10. The cover of claim 1 wherein said line of weakness comprises score lines.

11. A cover for a T-shaped pipe fitting made of a substantially flat, semi-rigid watertight material comprising a substantially rectilinear shaped body having two pairs of opposed corners, said body including a tab shaped element extending from each of said corners, wherein each pair of said opposed corners include fastening means for securing said opposed corners to one another when the cover is secured about the pipe fitting, said body being adapted to form to the shape of the pipe, and said cover further including at least one line of weakness constituting a means to trim said cover to correspond to the geometrical configuration of the pipe fitting and provide a secure fit of the cover about the pipe fitting on the job site.

12. The cover of claim 11 wherein said line of weakness comprises score lines.

* * * * *